United States Patent [19]

Olson et al.

[11] 4,284,685

[45] Aug. 18, 1981

[54] ABRASION RESISTANT SILICONE COATED POLYCARBONATE ARTICLE

[75] Inventors: Daniel R. Olson; Ona V. Orkin, both of Schenectady; Karen K. Webb, Ballston Lake, all of N.Y.

[73] Assignee: General Electric Company, Pittsfield, Mass.

[21] Appl. No.: 110,886

[22] Filed: Jan. 10, 1980

[51] Int. Cl.³ .................. B32B 27/30; B32B 27/08; G02B 1/08

[52] U.S. Cl. .................. 428/331; 427/162; 427/163; 427/164; 427/379; 427/387; 427/412.1; 428/412; 428/447; 428/451

[58] Field of Search ............ 427/387, 412.1, 162, 427/163, 164, 379; 428/412, 447, 331, 451

[56] References Cited

U.S. PATENT DOCUMENTS

| | | |
|---|---|---|
| 3,582,398 | 6/1971 | Ringler . |
| 3,707,397 | 12/1972 | Gagnon . |
| 3,968,305 | 7/1976 | Oshima et al. . |
| 3,968,309 | 7/1976 | Matsuo et al. . |
| 3,978,178 | 8/1976 | Oshima et al. . |
| 3,986,997 | 10/1976 | Clark . |
| 4,027,073 | 5/1977 | Clark . |
| 4,041,120 | 8/1977 | Oshima et al. . |
| 4,045,602 | 8/1977 | Sommer et al. . |
| 4,188,451 | 7/1980 | Humphrey .................. 428/412 X |
| 4,207,357 | 6/1980 | Goossens .................. 427/379 X |

*Primary Examiner*—Michael R. Lusignan
*Attorney, Agent, or Firm*—William F. Mufatti

[57] ABSTRACT

A shaped, non-opaque coated polycarbonate article having improved abrasion and chemical solvent resistance comprising a polycarbonate substrate having disposed on the surface thereof a non-opaque primer layer of controlled thickness comprised of a thermoset acrylic polymer and disposed on said primer layer a non-opaque top coat comprised of a colloidal silica filled thermoset organopolysiloxane.

23 Claims, No Drawings

ABRASION RESISTANT SILICONE COATED POLYCARBONATE ARTICLE

This invention relates to non-opaque abrasion and chemical solvent resistant colloidal silica filled thermoset organopolysiloxane coated shaped polycarbonate articles wherein the colloidal silica filled organopolysiloxane top coat is uniformly and tenaciously adhered to the polycarbonate substrate. More particularly, the present invention relates to a colloidal silica-filled organopolysiloxane coated polycarbonate article having a primer layer of controlled thickness disposed between the polycarbonate substrate and the colloidal silica-filled organopolysiloxane top coat, said primer layer comprising a thermoset acrylic polymer.

BACKGROUND OF THE INVENTION

The use of transparent glazing materials utilizing polycarbonate resin as a structural component for windows, windshields, and the like are well known. While these polycarbonate resins are easily fabricated into the desired shape and have excellent physical and chemical properties, such as being less dense than glass and having more breakage resistance than glass, their abrasion and chemical solvent resistance is relatively low.

In order to overcome this relatively low abrasion resistance and to otherwise improve the surface characteristics of the polycarbonate, various coatings have been applied onto the polycarbonate substrate. U.S. Pat. No. 3,582,398 describes a fabricated polycarbonate part having improved optical properties consisting of a polycarbonate substrate having a transparent coating thereon consisting of a thermoplastic polymethyl methacrylate. U.S. Pat. No. 4,061,652 describes a coating for polycarbonate resins comprised of (i) an acrylic resin which is a mixture of olefinically unsaturated organic monomers in combination with an acrylic polymer, and (ii) certain urethanes of hydroxybenzotriazoles and hydroxybenzophenones in combination with certain catalysts. U.S. Pat. Nos. 3,451,838, 3,986,997 and 4,027,073 disclose organopolysiloxane coating compositions and techniques for the application of these organopolysiloxane coatings onto polycarbonate surfaces. While these coatings have many desirable properties, e.g., they are hard, abrasion resistant, and chemical solvent resistant, these organopolysiloxane coatings do not in all instances possess the requisite degree of uniform adherence to and durability on these polycarbonate surfaces. U.S. Pat. No. 3,707,397 describes a process for providing a hard coating on, inter alia, polycarbonate articles, said process including priming the polycarbonate surface with an adhesion promoting thermosettable acrylic and applying an organopolysiloxane onto the primed surface. This reference further teaches that the thickness of the thermosettable acrylic polymer primer layer varies between 0.01 mil up to as much as 0.5 mil or even more.

However, organopolysiloxane coated polycarbonate articles which contain a thermoset acrylic polymer as primer have heretofore produced erratic results, i.e., in some cases, the polysiloxane top coat adhered and weathered well while in other instances the top coat failed to adhere satisfactorily or failed to weather well.

It has now been surprisingly discovered that if the primer layer is of a thickness of from about 0.015 to about 0.15 mil, then both the adhesion and weatherability of the organopolysiloxane top coat are good. If the primer layer is less than about 0.015 mil thick, the weatherability of the top coat is poor. If the primer layer is thicker than about 0.15 mil, then the adhesion of the top coat to the polycarbonate is poor.

The dependence of the performance of the organopolysiloxane top coat upon the thickness of the primer layer is surprising and has not heretofore been known or recognized by the prior art.

DESCRIPTION OF THE INVENTION

This invention relates to non-opaque colloidal silica-filled organopolysiloxane coated polycarbonate articles having a thermoset acrylic polymer adhesion promoting primer layer of controlled thickness of from about 0.015 to about 0.15 mil disposed between the polycarbonate surface and the colloidal silica-filled thermoset organopolysiloxane top coat.

In the practice of the present invention, prior to the application of the colloidal silica-filled organopolysiloxane coating to the polycarbonate surface, the surface is first primed by the application thereon of a primer layer of controlled thickness containing a thermoset acrylic polymer.

The aromatic carbonate polymers of the instant invention are known compounds and have recurring units of the formula:

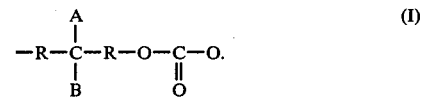

wherein each —R— is selected from the group consisting of phenylene, halo-substituted phenylene and alkyl substituted phenylene; and A and B are each selected from the group consisting of hydrogen, hydrocarbon radicals, free from aliphatic unsaturation and of radicals which together with the adjoining

atom form a cycloalkane radical, the total number of carbon atoms in A and B being up to 12.

These aromatic carbonate polymers may be prepared by methods well known in the art and described in U.S. Pat. Nos. 3,989,672, 3,275,601, and 3,028,365, all of which are incorporated herein by reference.

In the practice of this invention, any of the aromatic polycarbonates can be employed herein. However, particularly useful are the aromatic polycarbonates prepared by reacting a dihydric phenol, such as bisphenol-A (2,2-bis(4-hydroxyphenyl) propane) with a carbonate precursor. Typical of some of the dihydric phenols that may be employed in the practice of this invention are bis(4-hydroxyphenyl)methane, 2,2-bis(4-hydroxyphenyl)propane, 2,2-bis(4-hydroxy-3-methylphenyl)propane, 4,4-bis(4-hydroxyphenyl)heptane, 2,2-(3,5,3',5'-tetrabromo-4,4'-dihydroxydiphenyl)propane, 2,2-(3,5,3',5'-tetrabromo-4,4'-dihydroxydiphenyl)propane, (3,3'-dichloro-4,4'-dihydroxydiphenyl) methane. Other dihydric phenols of the bisphenol type are also available and are disclosed in U.S. Pat. Nos. 2,999,835, 3,028,365 and 3,334,154.

In addition, the reaction is carried out with the carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

The thermosettable acrylic polymers which are contained in the primer compositions are well known in the art. Exemplary thermosettable acrylics which may be utilized in the practice of this invention are set forth in *Encyclopedia of Polymer Science and Technology,* col. 1, Interscience Publishers, John Wiley & Sons, Inc., at p. 273 et seq., and in the *Chemistry of Organic Film Formers,* by D. H. Solomon, John Wiley & Sons, Inc., 1967, at p. 251 et seq., and the references cited therein, all of which are hereby incorporated herein by reference.

Generally, the term thermosettable acrylics as used herein includes an acrylic polymer or copolymer having reactive functional groups which are capable of reacting between themselves to effect a cross-linkage thereof. These functional groups may be the same, provided they are of the type which will react between themselves, or the polymer or copolymer may contain two or more different types of reactive functional groups, such as, for example, an epoxide group and a carboxyl group. The term thermosettable acrylics also includes acrylic polymers or copolymers having a reactive functional group which there is added an appropriate polymeric cross-linking agent which reacts with the functional group to effect cross-linking. The term thermosettable acrylics still further includes a mixture of two or more polymers containing cross-linkable functional reactive groups. These polymers may be acrylic polymers or copolymers having reactable, cross-linkable, functional groups thereon, or at least one of the polymers may be an acrylic polymer or copolymer having a reactive functional group and the other polymer or copolymer may be one or more other types of known polymers having functional groups which are reactive with the acrylic functional group to provide the thermoset product as a result of cross-linking.

Typically, the reactions involved in cross-linking the thermosettable acrylic polymers are reactions between, for example, epoxide functional groups and amine functional groups; epoxide functional groups and acid anhydride functional groups; epoxide functional groups and carboxyl functional groups, including phenolic hydroxyl groups; epoxide functional groups and N-methylol or N-methylol-ether; carboxyl functional groups and N-methylol or N-methylol-ether functional groups; interreaction between carboxyl and isocyanate groups; reactions between hydroxyl, for example polyols, and isocyanate groups, and reactions between amine groups and N-methylol or N-methylol-ether groups. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying monomer will be present in small amounts, that is, on the order of 25 weight percent or less, and typically, between about 1 and 20 percent of the monomer mass which is polymerized. Exemplary of these functional group-supplying monomers are glycidyl acrylate, glycidyl methacrylate, allyl glycidyl ether, dimethylaminoethyl methacrylate, vinyl pyridine, tert-butylaminoethyl-methacrylate, maleic anhydride, itaconic anhydride, allyl alcohol, monoalkyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate. Usually, the other monomer which will be polymerized along with the monomer supplying the functional group is a lower ($C_1$-$C_3$) alkyl acrylic ester or mixtures thereof, e.g., methyl acrylate, ethyl acrylate, methyl methacrylate, ethyl methacrylate, or mixtures thereof, in an amount ranging between about 75 parts to about 99 parts and, more typically, between about 80 parts to about 97 parts.

The thermosettable acrylics are in general applied from primer compositions containing (i) the thermosettable acrylics dissolved in an organic or inorganic solvent, or (ii) an emulsion containing the thermosettable acrylics, an alcohol and water. In the case wherein the primer composition contains a thermosettable acrylic dissolved in an organic solvent, the solvent should generally be relatively volatile and inert, i.e., one that will not readily react with or too deleteriously affect the polycarbonate substrate, but which is capable of dissolving the thermosettable acrylic.

The primer compositions contain sufficient thermosettable acrylic to provide a thermoset acrylic containing primer layer which is from about 0.015 to about 0.15 mil thick. Generally, this requires that the primer compositions contain from about 2 to about 20 weight percent of thermosettable acrylic solids.

The primer compositions of the instant invention may also optionally contain various flatting agents, ultraviolet light absorbent agents, surface-active agents, stabilizing agents, and thixotropic agents. All of these additives and the use thereof are well known in the art and do not require extensive discussions. Therefore, only a limited number will be referred to, it being understood that any compounds possessing the ability to function in such a manner, i.e., as a flatting agent, surface-active agent, and ultraviolet light absorbent agents, can be used.

The various surface-active agents, including anionic, cationic, and nonionic surface-active agents, are described in *Kirk-Othmer Encyclopedia of Chemical Technology,* Vol. 19, Interscience Publishers, New York, 1969, pp. 507–593, and *Encyclopedia of Polymer Science and Technology,* Vol. 13, Interscience Publishers, New York, 1960, pp. 477–486, both of which are references and incorporated herein.

Exemplary ultraviolet light absorbent compounds or stabilizers include those of the hydroxy benzophenone, cyanoacrylates, or benzotriazole series. Examples of these are: 2-hydroxy-4-n-octoxybenzophenone, substituted hydroxyphenylbenzotriazole, 2-(2'-hydroxy-5'-methylphenyl)benzotriazole, 2-hydroxy-4-methoxybenzophenone, ethyl 3,3-diphenyl-2-cyanoacrylate, and octyl 3,3-diphenyl-2-cyanoacrylate. Further examples of ultraviolet light absorbers which may be used in the practice of this invention may be found in U.S. Pat. No. 3,043,709.

A uniform film of the primer composition containing the further-curable thermosettable acrylic is applied onto the polycarbonate surface by any of the known means such as dipping, spraying, roll-coating and the like. After the formed polycarbonate part is coated with the primer composition, the inert volatile solvent is removed by drying the coated article until a substantial portion of the volatile solvent evaporates having a solid residue, and thereafter heat is applied to thermoset the thermosettable acrylic, thereby forming a primer layer of coating containing the thermoset acrylic on the polycarbonate surface to which the primer composition was applied. This primer layer is from about 0.015 to about 0.15 mil thick.

After the polycarbonate article which is to be coated has been primed by the application of the primer composition and the evaporation of the solvent component of the primer composition and the thermosetting of the thermosettable acrylic, the primed surface of the polycarbonate article is then coated with the colloidal silica-filled organopolysiloxane coating. In the practice of this invention, a colloidal silica-filled organopolysiloxane coating composition containing a further-curable organopolysiloxane and colloidal silica is applied onto the cured primer and is then cured to form a thermoset colloidal silica-filled organopolysiloxane coating.

The colloidal silica-filled further-curable organopolysiloxane top coat composition as disclosed in U.S. Pat. Nos. 3,986,997 and 4,027,073 comprises a dispersion of colloidal silica in a lower aliphatic alcohol-water solution of the partial condensate of a silanol having the formula $$R^4Si(OH)_3 \qquad (II)$$

wherein $R^4$ is selected from the group consisting of alkyl radicals containing from 1 to 3 carbon atoms, the vinyl radical, the 3,3,3-trifluoropropyl radical, the gamma-glycidoxypropyl radical and the gamma-methacryloxypropyl radical, with at least 70 percent by weight of said silanol being $(CH_3Si(OH)_3$. This composition generally contains from about 10 to about 50 percent by weight of solids, said solids consisting essentially of a mixture of from about 10 to about 70 percent by weight of colloidal silica and from about 30 to about 90 percent by weight of the partial condensate of a silanol. The partial condensate of a silanol, i.e., a siloxanol, is obtained, preferably, entirely from the condensation of $CH_3Si(OH)_3$, however, the partial condensate may also optionally be comprised of a major portion which is obtained from the condensation of $CH_3Si(OH)_3$ and a minor portion which is obtained from the condensation of monoethyltrisilanol, monopropyltrisilanol, monovinyltrisilanol, mono gamma-methacryloxy-propyltrisilanol, mono gamma-glycidoxypropyltrisilanol, or mixtures thereof. The composition further contains sufficient acid to provide a pH in the range of 3.0 to 6.0. The pH is maintained in this range in order to prevent premature gellation and increase the shelf life of the silica-filled organopolysiloxane top coat composition and to obtain optimum properties in the cured coating. Suitable acids include both organic and inorganic acids such as hydrochloric, chloroacetic, acetic, citric, benzoic, formic, propionic, maleic, oxalic, glycolic and the like. The acid can be added to either the silane, which hydrolyzes to form the silanol component of the composition, or the hydrosol prior to mixing the two components.

The trisilanol component of the top coat composition of the present invention is generated in situ by the addition of the corresponding trialkoxysilanes to aqueous dispersions of colloidal silica. Suitable trialkoxysilanes are those containing methoxy, ethoxy, isopropoxy and t-butoxy substituents. Upon generation of the silanol in the acidic aqueous medium, there is condensation of the hydroxyl substituents to form —Si—O—Si bonding. The condensation is not complete, but rather the siloxane retains an appreciable quantity of silicon-bonded hydroxyl groups, thus rendering the organopolysiloxane polymer soluble in the water-alcohol solvent. This soluble partial condensate can be characterized as a siloxanol polymer having at least one silicon-bonded hydroxyl group per every three —SiO— units. During curing of the top coating composition on the primer, these residual hydroxyl groups condense to give a silsesquioxane, $R^4SiO_{3/2}$.

The silica component of the top coat composition is present in the form of colloidal silica. Aqueous colloidal silica dispersions generally have a particle size in the range of 5 to 150 millimicrons in diameter. These silica dispersions are prepared by methods well known in the art and are commercially available. It is preferred to use colloidal silica having a particle size in the range of 10 to 30 millimicrons in diameter in order to obtain dispersions having a greater stability and to provide top coatings having superior optical properties.

The silica-filled organopolysiloxane top coat compositions are prepared by adding trialkoxysilanes to colloidal silica hydrosol and adjusting the pH to a range of 3.0 to 6.0 by the addition of acid. As mentioned previously, the acid can be added to either the silane or the silica hydrosol before the two components are mixed. Alcohol is generated during the hydrolysis of the trialkoxy silanes to the trisilanols. Depending upon the percent solids desired in the final coating composition, additional alcohol, water, or a water-miscible solvent can be added. Suitable alcohols are the lower aliphatic alcohols such as methanol, ethanol, isopropanol, t-butanol, and mixtures thereof. Generally, the solvent system should contain from about 20 to about 75 weight percent alcohol to ensure solubility of the siloxanol formed by the condensation of the silanol. If desired, a minor amount of an additional water-miscible polar solvent such as acetone, butyl cellosolve, and the like can be added to the water-alcohol solvent system. Generally, sufficient alcohol or water-alcohol solvent is added to give a composition containing from about 10 to about 50 percent by weight of solids, said solids generally comprising from about 10 to about 70 percent by weight of colloidal silica and from about 30 to about 90 percent by weight of the partial condensate of the silanol. The composition is allowed to age for a short period of time to ensure formation of the partial condensate of the silanol, i.e., the siloxanol. This condensation occurs upon generation of the silanol in the acidic aqueous medium through the hydroxyl substituents to form Si—O—Si bonding. The condensation is not complete, resulting in a siloxane having an appreciable quantity of silicon-bonded hydroxyl group. This aged, silica-filled further-curable organopolysiloxane top coat composition is then applied onto the primed polycarbonate by any of the commonly known methods such as dipping, spraying, flow-coating and the like. After the top coat composition is applied to the primed polycarbonate, the polycarbonate is air dried to evaporate the volatile solvents from the top coat composition. Thereafter, heat is applied to cure the top coat. During curing, the residual hydroxyls of the siloxane condense to give a silsesquioxane, $R^4SiO_{3/2}$. The result is a silica-filled cross-linked organo-polysiloxane top coat which is tenaciously adhered to the substrate and is highly resistant to scratching, abrasion, chemical solvents, and marring. Generally, the top coat contains from about 10 to about 70 weight percent silica and from about 30 to about 90 weight percent of the organopolysiloxane present as the silsesquioxane $R^4SiO_{3/2}$.

The thickness of the top coat generally is dependent upon the method of application and upon the weight percent solids present in the colloidal silica-filled further curable organopolysiloxane top coat composition. In general, the higher the percent solids, and the longer the application time, the greater the thickness of the top coat. It is preferred that the cured top coat have a thickness of from about 0.05 to about 0.5 mil, more preferably from 0.10 to about 0.4 mil, and most preferably from about 0.15 to about 0.25 mil.

PREFERRED EMBODIMENT OF THE INVENTION

In order that those skilled in the art may better understand how the present invention may be practiced, the following examples are given by way of illustration and not by way of limitation. Unless otherwise specified, all percentages and parts are by weight.

EXAMPLE 1

An aromatic polycarbonate is prepared by reacting 2,2-bis(4-hydroxyphenol)propane and phosgene in the presence of an acid acceptor and a molecular weight regulator and having an intrinsic viscosity of 0.57. The product is then fed to an extruder, which extruder is operated at about 265° C. and the extrudate is comminuted into pellets.

The pellets are then injection molded at about 315° C. into test panels of about 4 in. by 4 in. by about ⅛ in. thick. The test panels are subjected to an abrasion test. The abrasion test is one wherein test panels having a ¼ inch diameter hole cut in the center are subjected to a Taber Abraser. The Taber Abraser is equipped with CS-10F wheels which are resurfaced every 200 cycles by abrading for 25 cycles on an S-11 refacing disc. The weights used in combination with the CS-10F wheels are 500 gm. weights. Initial measurements of % Haze are made at four places around the future wear track of the sample using a Gardner Hazemeter. The sample is abraded for 300 cycles, cleaned with isopropanol, and the % Haze is remeasured at the same four places. The four differences in % Haze are calculated and averaged to give the Δ % Haze. The results of this abrasion test are set forth in Table I.

A colloidal silica-filled further-curable organopolysiloxane top coat composition is prepared as follows: Glacial acetic scid (0.2 grams) is added to 200 grams of a commercially available aqueous dispersion of colloidal silica having an initial pH of 3.1 containing 34% $SiO_2$ of approximately 15 millimicron particle size and having a $Na_2O$ content of less than 0.01 weight percent. Methyltrimethoxysilane (138 grams) is added to the stirred acidified dispersion generating methanol and methyltrisilanol. After standing for about one hour, the pH of the composition stabilizes as 4.5. The pH of the composition is adjusted to a range of from 3.7 to 5.6. The composition is aged for 4 days to ensure formation of the partial condensate of $CH_3Si(OH)_3$ in the silica methanol-water dispersion. The composition contains 40% solids, half of which is $SiO_2$ and the other half silicone calculated on the basis $CH_3SiO_{3/2}$ weight available in the cured composition. The aged composition is diluted to 25 weight % solids by addition of isopropanol.

EXAMPLE 2

This example is designed to illustrate the criticality of the particular combination of the thermoset acrylic polymer primer layer and colloidal silica filled organopolysiloxane top coat in providing a durable and tenaciously adhered coating effective to produce an abrasion resistant polycarbonate article. Unprimed polycarbonate panels are prepared substantially in accordance with Example 1 and are flow-coated with a silica-filled organopolysiloxane top coat composition prepared substantially in accordance with the procedure set forth above. Excess top coat composition is permitted to drain off and the coated unprimed test panels are air dried for 30 minutes to evaporate the solvent, followed by a one-hole bake at 250° F. to cure the further-curable organopolysiloxane. These unprimed coated test panels are subjected to an adhesion test and the results are set forth in Table I. The adhesion test consists of using a multiple blade tool to art parallel grooves about 1 mm apart through the top coat into the substrate, rotating the sample 90° and repeating the cutting process thereby forming a grid pattern of 1 mm squares cut into the coating, and applying an adhesive tape over the cross-hatched area and quickly pulling said tape off (a sample fails the adhesion test if any of the squares in the grid are pulled off).

The following Examples illustrate primed, top-coated polycarbonate articles falling outside the scope of the instant invention wherein the thermoset acrylic primer layer is thinner than 0.015 mil or thicker than 0.15 mil.

EXAMPLE 3

One hundred (100) parts by weight of Hycar ® 2600x 256 (trademark of B. F. Goodrich Co., carboxyl functional thermosetting acrylic) is diluted with a sufficient amount of butoxyethanol to give a primer composition containing 1 weight % solids. This composition is flow coated onto a polycarbonate test panel prepared substantially in accordance with Example 1. The coated test panel is allowed to drain for 10 minutes, is air dried for 30 minutes, and is then heated at 125° C. for 1 hour to cure the thermosettable acrylic to the thermoset stage. The thickness of the cured primer layer is 0.002 mil. The primed test panel is then flow coated with the colloidal silica-filled organopolysiloxane top coat composition prepared substantially in accordance with the procedure as set forth above. Excess top coat solution is allowed to drain off and the panels are allowed to air dry for 30 minutes to evaporate off a substantial portion of the solvent. The panels are then baked for 1 hour at 125° C. to effect the cure of the further-curable organopolysiloxane.

EXAMPLE 4

A primer composition is prepared by admixing 80 parts by weight of Rhoplex ® AC-658 (trademark of Rohm and Haas Co., hydroxyl functional thermosetting acrylic), 20 parts by weight of CY 179 ® (trademark of Ciba-Geigy, aliphatic difunctional epoxide), 1 part by weight of toluene sulfonic acid, 10 parts by weight of 2,4-dihydroxybenzophenone, and sufficient butoxyethanol to give a composition containing 1 weight percent solids. This primer composition is flow coated onto a polycarbonate test panel prepared substantially in accordance with Example 1. The coated test panel is allowed to drain for 10 minutes, is air dried for 30 minutes, and is then heated at 125° C. for 1 hour to cure the thermosettable acrylic to the thermoset stage. The thickness of the cured primer layer is 0.003 mil. The primed test panel is then coated with the colloidal silica filled organopolysiloxane top coat substantially in accordance with the procedures set forth in Example 3.

EXAMPLE 5

A primed top-coated panel is prepared substantially in accordance with Example 4 except that sufficient butoxyethanol is added to give a primer composition containing 2 weight percent solids which results in a cured primer layer having a thickness of 0.005 mil.

EXAMPLE 6

A primed top-coated test panel is prepared substantially in accordance with the procedure of Example 3 except that sufficient butoxyethanol is added to give a primer composition containing 2 weight percent solids which results in a cured primer layer which is 0.005 mil thick.

EXAMPLE 7

A primed top-coated test panel is prepared substantially in accordance with the procedure of Example 3 except that sufficient butoxyethanol is added to give a primer composition containing 4 weight percent solids which results in a cured primer layer which is 0.012 mil thick.

EXAMPLE 8

A primed top-coated test panel is prepared substantially in accordance with the procedure of Example 3 except that sufficient butoxyethanol is added to give a primer composition containing about 12 weight percent solids which results in a cured primer layer which is 0.208 mil thick.

EXAMPLE 9

A primer composition is prepared by admixing 80 parts by weight of Rhoplex AC-658 (hydroxy functional thermosettable acrylic), 20 parts by weight of CY-179 (aliphatic difunctional epoxide), 1 part by weight of toluene sulfonic acid and sufficient butoxyethanol to give a primer composition containing about 10 weight percent solids. This primer composition is flow coated onto a polycarbonate test panel prepared substantially in accordance with Example 1. The coated test panel is allowed to drain for 10 minutes, is air dried for 30 minutes, and is then heated at 125° C. for 1 hour to cure the thermosettable acrylic to the thermoset stage. The thickness of the cured primer layer is 0.210 mil. The primed test panel is then coated with the colloidal silica-filled organopolysiloxane top coat substantially in accordance with the procedures set forth in Example 3.

EXAMPLE 10

A primed top-coated test panel is prepared substantially in accordance with Example 4 except that sufficient butoxyethanol is added to give a primer composition containing about 10 weight percent solids which results in a cured primer layer which is 0.215 mil thick.

EXAMPLE 11

A primer composition is prepared by admixing 80 parts by weight of Rhoplex AC-658 (hydroxy functional thermosetting acrylic), 20 parts by weight of Cymel 303 (trademark of American Cyanamid Co., a melamine), 10 parts by weight of 2,4-dihydroxybenzophenone, 1 part by weight of toluene sulfonic acid, and sufficient butoxyethanol to give a primer composition containing about 10 weight percent solids. This primer composition is flow coated onto a polycarbonate test panel prepared substantially in accordance with Example 1. The coated test panel is allowed to drain for 10 minutes, is air dried for 30 minutes, and is then heated at 125° C. for 1 hour to cure the thermosettable acrylic to the thermoset stage. The thickness of the thermoset acrylic primer layer is 0.230 mil. The primed test panel is then coated with the colloidal silica-filled organopolysiloxane top coat substantially in accordance with the procedure set forth in Example 3.

EXAMPLE 12

A primed top-coated test panel is prepared substantially in accordance with the procedure of Example 4 except that sufficient butoxyethanol is added to give a primer composition containing about 12 weight percent solids which results in a cured primer layer which is 0.395 mil thick.

EXAMPLE 13

A primed top-coated test panel is prepared substantially in accordance with the procedure of Example 11 except that sufficient butoxyethanol is added to give a primer composition containing about 12 weight percent solids which results in a cured primer layer which is 0.480 mil thick.

The primed top-coated panels produced in Examples 3-13 are subjected to the aforedescribed abrasion test, the aforedescribed adhesion test, or both, and the results are set forth in Table I.

The following Examples illustrate primed top-coated polycarbonate articles falling within the scope of the instant invention wherein the thermoset acrylic primer layer has a controlled thickness of from about 0.015 to about 0.20 mil.

EXAMPLE 14

A primer composition is prepared by adding a sufficient amount of a mixture comprised of 65 parts of water and 35 parts butoxyethanol to Rhoplex AC-658 (hydroxyfunctional thermosetting acrylic) to provide a primer composition containing about 4 weight percent solids. This primer composition is flow coated onto a polycarbonate test panel prepared substantially in accordance with the procedure of Example 1. The coated test panel is allowed to drain for 10 minutes, and is then heated at 125° C. for 1 hour to cure the thermosettable acrylic to the thermoset stage. The thickness of the cured primer layer is 0.018 mil. The primed test panel is then coated with the colloidal silica-filled organopolysiloxane top coat substantially in accordance with the procedure is set forth in Example 3.

EXAMPLE 15

A primed top-coated test panel is prepared substantially in accordance with the procedure of Example 3 except that suffifient butoxyethanol is to give a primer composition containing about 6 weight percent solids which results in a cured primer layer having a thickness of 0.026 mil.

EXAMPLE 16

A primed top-coated test panel is prepared substantially in accordance with the procedure set forth in Example 4 except that sufficient of the water/butoxyethanol mixture is used to give a primer composition containing about 8 weight percent solids which results in a cured primer layer having a thickness of 0.036 mil.

EXAMPLE 17

A primed top-coated test panel is prepared substantially in accordance with the procedure set forth in Example 11 except that sufficient butoxyethanol is used to give a primer composition containing about 6 weight percent solids which results in a cured primer layer having a thickness of 0.044 mil.

EXAMPLE 18

A primed top-coated test panel is prepared substantially in accordance with the procedure set forth in Example 3 except that sufficient butoxyethanol is used to give a primer composition containing about 8 weight percent solids which results in a cure primer layer having a thickness of 0.063 mil.

EXAMPLE 19

A primed top-coated test panel is prepared substantially in accordance with the procedure set forth in Example 14 except that sufficient butoxyethanol is used to give a primer composition containing about 18 weight percent solids which results in a cured primer layer having a thickness of 0.098 mil.

EXAMPLE 20

A primed top-coated test panel is prepared substantially in accordance with the procedure set forth in Example 4 except that sufficient butoxyethanol is used to give a primer composition containing about 8 weight percent solids which results in a cured primer layer having a thickness of 0.102 mil.

EXAMPLE 21

A primed top-coated test panel is prepared substantially in accordance with the procedure set forth in Example 3 except that sufficient butoxyethanol is used to give a primer composition containing about 10 weight percent solids which results in a cured primer layer having a thickness of 0.127 mil.

TABLE I

| Example | Thickness, in mils, of primer layer | Initial Adhesion | Adhesion after Exposure to RS Sunlamp | % Haze, 300 Cycles |
|---|---|---|---|---|
| 1 (uncoated) | — | — | — | 34 |
| 2 (unprimed) | 0 | marginal | Fails after 36 hours | — |
| 3 | 0.002 | pass | Fails after 90 hours | 3.6 |
| 4 | 0.003 | marginal | Fails after 96 hours | — |
| 5 | 0.005 | marginal | Fails after 96 hours | — |
| 6 | 0.005 | pass | Fails after 90 hours | 3.5 |
| 7 | 0.012 | pass | Fails after 90 hours | 3.6 |
| 14 | 0.018 | pass | Fails after 327 hours | 2.9 |
| 15 | 0.026 | pass | Fails after 298 hours | 4.0 |
| 16 | 0.036 | pass | Passes after 869 hours | 3.2 |
| 17 | 0.044 | pass | Fails after 782 hours | — |
| 18 | 0.063 | pass | Fails after 939 hours | 4.8 |

TABLE I-continued

| Example | Thickness, in mils, of primer layer | Initial Adhesion | Adhesion after Exposure to RS Sunlamp | % Haze, 300 Cycles |
|---|---|---|---|---|
| 19 | 0.098 | pass | Fails after 327 hours | 3.8 |
| 20 | 0.102 | pass | Passes after 1509 hours | — |
| 21 | 0.127 | pass | Passes after 1147 hours | 5.3 |
| 8 | 0.208 | pass | Passes after 1267 hours | 9.8 |
| 9 | 0.210 | pass | — | 13.2 |
| 10 | 0.215 | fails | — | — |
| 11 | 0.230 | fails | — | — |
| 12 | 0.395 | fails | — | — |
| 13 | 0.480 | fails | — | — |

Table I clearly illustrates that a primer thickness of from 0.015 to 0.15 mil is critical. Thus, in Examples 14–21, wherein the primer thickness is in the range of from about 0.015 to about 0.15 mil thick, the initial adhesion, weathering (adhesion after exposure to RS sunlamp), and abrasion resistance of the colloidal silica filled organopolysiloxane top coat are all good. In examples 3–7, wherein the primer is thinner than 0.015 mil, the weathering of the top coat is poor. In Examples 8–13, wherein the primer is thicker than 0.15 mil, both the adhesion and abrasion resistance of the top coat rapidly deteriorate.

While the invention has been described above with particularity, it will, of course, be apparent that modifications may be made which, pursuant to the patent statutes and laws, do not depart from the spirit and scope of the invention.

What we claim as new and desire to secure by Letters Patents of the United States is:

1. A coated polycarbonate article having improved abrasion and chemical solvent resistance comprising a polycarbonate substrate having adhered on at least one surface thereof (i) an adhesion promoting primer layer having a controlled thickness of from about 0.015 to about 0.15 mils consisting essentially of a thermoset acrylic polymer; and (ii) a top coat on said primer layer comprised of a colloidal silica-filled thermoset organopolysiloxane.

2. The article of claim 1 wherein said colloidal silica-filled thermoset organopolysiloxane is a condensation product of a silanol having the formula $RSi(OH)_3$, wherein R is selected from an alkyl radical of from 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$.

3. The article of claim 2 wherein said colloidal silica-filled thermoset organopolysiloxane is the condensation product of $CH_3Si(OH)_3$.

4. The article of claim 2 wherein said colloidal silica-filled thermoset organopolysiloxane contains from about 10 to about 70 weight percent of colloidal silica.

5. The article of claim 3 wherein said thermoset silica-filled organopolysiloxane contains from about 10 to about 70 weight percent of colloidal silica.

6. The article of claim 1 wherein said primer layer contains at least one ultraviolet light absorbing agent.

7. A coated polycarbonate article having improved abrasion and chemical solvent resistance comprising a polycarbonate substrate having on at least one surface thereof (i) an adhesion promoting primer layer having a controlled thickness of from about 0.015 to about 0.15 mil consisting essentially of a thermoset acrylic polymer; and (ii) a top coat on said primer layer comprising the thermally cured product of a composition comprising a dispersion of colloidal silica in a lower aliphatic alcohol-water solution of the partial condensate of at least one silanol, said composition containing 10 to 50 weight percent solids consisting essentially of 10 to 70 weight percent colloidal silica and 30 to 90 weight percent of the partial condensate.

8. The article of claim 7 wherein said silanol is $CH_3Si(OH)_3$.

9. The article of claim 7 wherein said primer layer contains at least one ultraviolet light absorbing agent.

10. A coated polycarbonate article comprising a polycarbonate substrate having on at least one surface thereof (i) an adhesion promoting primer layer having a controlled thickness of from about 0.015 to about 0.15 mil consisting essentially of a thermoset acrylic polymer, and (ii) a top coat on said primer layer comprised of a colloidal silica-filled thermoset organopolysiloxane, said thermoset organopolysiloxane being the thermally cured product of at least one silanol.

11. The article of claim 10 wherein said colloidal silica-filled thermoset organopolysiloxane contains from about 10 to about 70 weight percent of colloidal silica.

12. The article of claim 11 wherein said silanol is $CH_3Si(OH)_3$.

13. The article of claim 10 wherein said primer layer contains at least one ultraviolet light absorbing agent.

14. A coated polycarbonate article comprising a polycarbonate substrate having on at least one surface thereof (i) a primer layer having a controlled thickness of from about 0.015 to about 0.15 mil consisting essentially of a thermoset acrylic polymer which is the thermally cured product of a thermosettable acrylic polymer; and (ii) a top coat composition on said primer layer, said top coat composition comprising a dispersion of colloidal silica in a lower aliphatic alcohol-water solution of the partial condensate of at least one silanol, said composition containing 10 to 50 weight percent solids consisting essentially of 10 to 70 weight percent colloidal silica and 30 to 90 weight percent of the partial condensate.

15. The article of claim 14 wherein said primer layer contains at least one ultraviolet light absorbing agent.

16. The article of claim 2 wherein said thermoset acrylic polymer is the thermally cured product of a thermosettable acrylic polymer.

17. The article of claim 7 wherein said silanol is represented by the formula $RSi(OH)_3$ wherein R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical.

18. The article of claim 17 wherein at least 70 weight percent of said silanol is $CH_3Si(OH)_3$.

19. The article of claim 18 wherein said composition contains sufficient acid to provide a pH in the range of 3.0 to 6.0.

20. The article of claim 17 wherein said thermoset acrylic polymer is the thermally cured product of a thermosettable acrylic polymer.

21. The article of claim 11 wherein said silanol is represented by the formula $RSi(OH)_3$ wherein R is selected from the group consisting of alkyl radicals containing 1 to 3 carbon atoms, the vinyl radical, the 3,3,3-trifluoropropyl radical, the gamma-glycidoxypropyl radical and the gamma-methacryloxypropyl radical.

22. The article of claim 21 wherein at least 70 weight percent of said silanol is $CH_3Si(OH)_3$.

23. The article of claim 11 wherein said thermoset acrylic polymer is the thermally cured product of a thermosettable acrylic polymer.

* * * * *